(12) United States Patent
Reddy et al.

(10) Patent No.: US 7,607,483 B2
(45) Date of Patent: Oct. 27, 2009

(54) SEALANT COMPOSITIONS COMPRISING COLLOIDALLY STABILIZED LATEX AND METHODS OF USING THE SAME

(75) Inventors: B. Raghava Reddy, Duncan, OK (US); Anthony V. Palmer, Ardmore, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 313 days.

(21) Appl. No.: 10/827,022

(22) Filed: Apr. 19, 2004

(65) Prior Publication Data

US 2005/0230112 A1 Oct. 20, 2005

(51) Int. Cl.
E21B 33/13 (2006.01)
(52) U.S. Cl. .................................. 166/293; 507/219
(58) Field of Classification Search ................ 166/293; 507/219
See application file for complete search history.

(56) References Cited

U.S. PATENT DOCUMENTS

| | | |
|---|---|---|
| 2,876,841 A | 3/1959 | Ryan |
| 3,042,608 A | 7/1962 | Morris |
| 3,359,225 A | 12/1967 | Weisend |
| 3,487,038 A | 12/1969 | Toy et al. .................. 260/29.7 |
| 3,622,127 A | 11/1971 | Burke, Jr. |
| 3,793,244 A | 2/1974 | Megee et al. .............. 260/29.7 |
| 3,857,918 A | 12/1974 | Wyss et al. |
| 3,887,653 A | 6/1975 | Konishi et al. |
| 3,917,771 A | 11/1975 | Basile |
| 4,062,822 A | 12/1977 | Lesage |
| 4,182,677 A | 1/1980 | Bocard et al. .................. 210/36 |
| 4,301,016 A | 11/1981 | Carriere et al. ........... 252/8.5 C |
| 4,384,096 A | 5/1983 | Sonnabend ................. 526/313 |
| 4,391,643 A | 7/1983 | Murphey |
| 4,412,017 A | 10/1983 | Van Eenam |
| 4,486,316 A | 12/1984 | Carriere et al. ........... 252/8.5 C |
| 4,537,918 A | 8/1985 | Parcevaux et al. .......... 523/130 |
| 4,664,816 A | 5/1987 | Walker ..................... 252/8.512 |
| 4,670,501 A | 6/1987 | Dymond et al. ............. 524/458 |
| 4,721,160 A | 1/1988 | Parcevaux et al. |
| 4,767,460 A | 8/1988 | Parcevaux et al. ............. 106/90 |
| 4,777,200 A | 10/1988 | Dymond et al. ............. 524/458 |
| 4,818,288 A | 4/1989 | Aignesberger et al. ........ 106/90 |
| 4,849,018 A | 7/1989 | Babcock et al. |
| 4,861,822 A | 8/1989 | Keskey et al. ................ 524/559 |
| 5,135,577 A | 8/1992 | Brothers ..................... 106/724 |
| 5,151,203 A | 9/1992 | Riley et al. |
| 5,159,980 A | 11/1992 | Onan et al. .................. 166/294 |
| 5,238,064 A | 8/1993 | Dahl et al. |
| 5,244,304 A | 9/1993 | Weill et al. .................... 404/67 |
| 5,290,356 A | 3/1994 | Frankowski ................. 106/726 |
| 5,293,938 A | 3/1994 | Onan et al. .................. 166/293 |
| 5,296,627 A | 3/1994 | Tang et al. .................... 558/34 |
| 5,346,012 A | 9/1994 | Heathman et al. ........... 166/293 |
| 5,373,901 A | 12/1994 | Norman et al. |
| 5,387,626 A | 2/1995 | Bohme-Kovac et al. ....... 524/35 |
| 5,389,706 A | 2/1995 | Heathman et al. ............... 524/5 |
| 5,403,822 A | 4/1995 | Mueller et al. |
| 5,456,751 A | 10/1995 | Zandi et al. .................. 106/724 |
| 5,563,201 A | 10/1996 | Joanicot et al. .............. 524/425 |
| 5,588,488 A | 12/1996 | Vijn et al. .................... 166/293 |
| 5,688,844 A | 11/1997 | Chatterji et al. ................ 528/8 |
| 5,770,760 A | 6/1998 | Robinson ..................... 560/221 |
| 5,779,787 A | 7/1998 | Brothers et al. ............. 106/802 |
| 5,780,369 A | 7/1998 | Allison et al. |
| 5,795,924 A | 8/1998 | Chatterji et al. ............. 523/130 |
| 5,826,669 A | 10/1998 | Zaleski et al. |
| 5,873,413 A | 2/1999 | Chatterji et al. ............. 166/293 |
| 5,900,451 A | 5/1999 | Krishnan et al. ............ 524/502 |
| 5,911,282 A | 6/1999 | Onan et al. |
| 5,913,364 A | 6/1999 | Sweatman ................... 166/281 |

(Continued)

FOREIGN PATENT DOCUMENTS

CN 1458114 A 11/2003

(Continued)

OTHER PUBLICATIONS

Halliburton brochure entitled "Stabilizer 434C Surfactant" dated 1998.

(Continued)

Primary Examiner—William P Neuder
Assistant Examiner—Nicole A Coy
(74) Attorney, Agent, or Firm—Craig W. Roddy; Conley Rose, P.C.

(57) ABSTRACT

Sealant compositions comprising a colloidally stabilized latex and methods of using the same to service a wellbore are provided. The sealant compositions may include: an aliphatic conjugated diene monomer; an additional monomer comprising a non-aromatic unsaturated mono- or di-carboxylic ester monomer, an aromatic unsaturated monomer, a nitrogen-containing monomer, or combinations thereof; and a protective colloid. The foregoing sealant composition may be displaced into the wellbore to isolate the subterranean formation from a portion of the wellbore, to support a conduit in the wellbore, to plug a void or crack in the conduit, to plug a void or crack in a cement sheath disposed in an annulus of the wellbore, to plug an opening between the cement sheath and the conduit, or combinations thereof. The colloidally stabilized latex remains substantially stable when exposed to salt, which may be present in the wellbore and/or in the sealant composition itself.

33 Claims, No Drawings

U.S. PATENT DOCUMENTS

| | | | |
|---|---|---|---|
| 5,945,387 A | 8/1999 | Chatterji et al. ............. | 507/224 |
| 5,964,293 A | 10/1999 | Chatterji et al. ............. | 166/294 |
| 6,060,434 A | 5/2000 | Sweatman et al. .......... | 507/216 |
| 6,063,738 A | 5/2000 | Chatterji et al. | |
| 6,098,711 A | 8/2000 | Chatterji et al. ............. | 166/294 |
| 6,130,287 A | 10/2000 | Krishnan .................... | 524/547 |
| 6,156,808 A | 12/2000 | Chatterji et al. ............. | 516/116 |
| 6,167,967 B1 | 1/2001 | Sweatman .................. | 166/281 |
| 6,177,483 B1 | 1/2001 | Tehrani et al. | |
| 6,209,646 B1 | 4/2001 | Reddy et al. | |
| 6,234,251 B1 | 5/2001 | Chatterji et al. ............. | 166/295 |
| 6,258,757 B1 | 7/2001 | Sweatman et al. .......... | 507/219 |
| 6,271,181 B1 | 8/2001 | Chatterji et al. ............. | 507/219 |
| 6,297,202 B1 | 10/2001 | Chatterji et al. ............. | 507/261 |
| 6,328,106 B1 | 12/2001 | Griffith et al. ............... | 166/295 |
| 6,330,917 B2 | 12/2001 | Chatterji et al. ............. | 166/295 |
| 6,367,550 B1 | 4/2002 | Chatterji et al. | |
| 6,401,817 B1 | 6/2002 | Griffith et al. ............... | 166/295 |
| 6,448,206 B1 | 9/2002 | Griffith et al. ............... | 507/219 |
| 6,503,870 B2 | 1/2003 | Griffith et al. | |
| 6,508,305 B1 | 1/2003 | Brannon et al. ............. | 166/293 |
| 6,508,306 B1 | 1/2003 | Reddy et al. ................. | 166/295 |
| 6,516,884 B1 | 2/2003 | Chatterji et al. ............. | 166/294 |
| 6,518,224 B2 | 2/2003 | Wood | |
| 6,527,051 B1 | 3/2003 | Reddy et al. | |
| 6,528,563 B2 | 3/2003 | Kaiser et al. ................ | 524/239 |
| 6,534,449 B1 | 3/2003 | Gilmour et al. | |
| 6,547,871 B2 | 4/2003 | Chatterji et al. | |
| 6,554,071 B1 | 4/2003 | Reddy et al. | |
| 6,555,507 B2 | 4/2003 | Chatterji et al. ............. | 507/219 |
| 6,561,273 B2 | 5/2003 | Brothers et al. | |
| 6,581,701 B2 | 6/2003 | Heying ........................ | 175/72 |
| 6,593,402 B2 | 7/2003 | Chatterji et al. ............... | 524/7 |
| 6,641,660 B1 | 11/2003 | Chatterji et al. ............. | 106/724 |
| 6,645,288 B1 | 11/2003 | Dargaud et al. ............. | 106/696 |
| 6,668,928 B2 | 12/2003 | Brothers ..................... | 166/292 |
| 6,702,021 B1 | 3/2004 | Nguyen et al. | |
| 6,702,044 B2 | 3/2004 | Reddy et al. .................. | 175/64 |
| 6,715,568 B1 | 4/2004 | Bailey | |
| 6,722,433 B2 | 4/2004 | Brothers et al. ............... | 166/28 |
| 6,729,405 B2 | 5/2004 | DiLullo et al. | |
| 6,742,592 B1 | 6/2004 | Le Roe-Delage et al. ... | 166/293 |
| 6,823,940 B2 | 11/2004 | Reddy et al. ................. | 166/295 |
| 6,832,651 B2 | 12/2004 | Ravi et al. ................... | 166/292 |
| 6,837,316 B2 | 1/2005 | Reddy et al. .................. | 175/64 |
| 6,848,519 B2 | 2/2005 | Reddy et al. | |
| 6,881,708 B2 | 4/2005 | Reddy et al. | |
| 6,887,832 B2 | 5/2005 | Kirsner et al. | |
| 6,887,833 B2 | 5/2005 | Brothers et al. | |
| 6,902,001 B2 | 6/2005 | Dargaud et al. | |
| 6,926,081 B2 | 8/2005 | Sweatman et al. | |
| 6,957,702 B2 | 10/2005 | Brothers et al. | |
| 6,962,201 B2 | 11/2005 | Brothers | |
| 7,007,755 B2 | 3/2006 | Reddy et al. | |
| 7,143,828 B2 | 12/2006 | Reddy et al. | |
| 7,172,022 B2 | 2/2007 | Reddy et al. | |
| 7,213,645 B2 | 5/2007 | Sweatman et al. | |
| 2003/0036484 A1 | 2/2003 | Kirsner et al. | |
| 2003/0121659 A1* | 7/2003 | Brothers ..................... | 166/292 |
| 2004/0007360 A1 | 1/2004 | Leroy-Delage et al. ..... | 166/293 |
| 2004/0040712 A1 | 3/2004 | Ravi et al. | |
| 2004/0055748 A1 | 3/2004 | Reddy et al. | |
| 2004/0144537 A1 | 7/2004 | Reddy et al. ................. | 166/292 |
| 2004/0152603 A1 | 8/2004 | Kirsner et al. | |
| 2004/0168798 A1 | 9/2004 | Creel et al. ................. | 166/270 |
| 2004/0168802 A1 | 9/2004 | Creel et al. ................. | 166/293 |
| 2004/0168804 A1 | 9/2004 | Reddy et al. ................. | 166/295 |
| 2004/0171499 A1 | 9/2004 | Ravi et al. ................... | 507/200 |
| 2004/0180794 A1 | 9/2004 | Reddy et al. | |
| 2004/0198872 A1 | 10/2004 | Reddy et al. .................... | 524/3 |
| 2005/0061206 A1 | 3/2005 | Reddy et al. | |
| 2005/0080176 A1 | 4/2005 | Robb | |
| 2005/0113262 A1 | 5/2005 | Ravi et al. | |
| 2006/0122071 A1 | 6/2006 | Reddy et al. | |
| 2006/0289165 A1 | 12/2006 | Smith et al. | |
| 2007/0111900 A1 | 5/2007 | Reddy et al. | |
| 2007/0111901 A1 | 5/2007 | Reddy et al. | |
| 2007/0287639 A1 | 12/2007 | Reddy et al. | |

FOREIGN PATENT DOCUMENTS

| | | |
|---|---|---|
| FR | 2 780 752 | 1/2000 |
| GB | 2 271 350 | 4/1994 |
| JP | 2001146457 | 5/2001 |
| WO | WO 2004/101463 A2 | 11/2004 |
| WO | WO 2004/101951 A1 | 11/2004 |
| WO | WO 2004/101952 A1 | 11/2004 |

OTHER PUBLICATIONS

Halliburton brochure entitled "Stabilizer 434B Latex Stabilizer" dated 1999.

Halliburton brochure entitled "Latex 2000 Cement Additive" dated 1998.

Halliburton brochure entitled "D-Air 3000 and D-Air 3000L Defoamers" dated 1999.

Halliburton brochure entitled "CFR-3™ Cement Friction Reducer Dispersant" dated 2004.

Halliburton brochure entitled "Halad®-447 Fluid-Loss Additive" dated 1999.

Halliburton brochure entitled "LA-2 Latex Fluid-Loss Additive" dated 1999.

Halliburton brochure entitled "Silicalite Cement Additive" dated 1999.

Dow Reichhold Specialty Latex LLC™ brochure entitled "TYCHEM® 68710-00".

Dow Reichhold Specialty Latex LLC™ Material Safety Data Sheet dated Jun. 23, 2004.

Patent Application entitled "Oil Well Sealant Compositions Comprising Alkali Swellable Latex" filed Dec. 7, 2004, as U.S. Appl. No. 11/010,117, by B. Raghava Reddy et al.

Foreign communication from a related counterpart application dated Jul. 26, 2005.

Advisory Action dated Feb. 28, 2006 (4 pages), U.S. Appl. No. 11/010,117, filed Dec. 8, 2004.

Advisory Action dated Jul. 12, 2007 (4 pages), U.S. Appl. No. 11/010,117, filed Dec. 8, 2004.

Foreign communication from a related counterpart application—International Search Report and the Written Opinion, PCT/GB2005/004455, Apr. 13, 2006, 11 pages.

Office Action dated Jun. 29, 2005 (21 pages), U.S. Appl. No. 11/010,117, filed Dec. 8, 2004.

Office Action dated Dec. 8, 2005 (7 pages), U.S. Appl. No. 11/010,117, filed Dec. 8, 2004.

Office Action dated May 17, 2006 (9 pages), U.S. Appl. No. 11/010,117, filed Dec. 8, 2004.

Office Action dated Oct. 31, 2006 (8 pages), U.S. Appl. No. 11/010,117, filed Dec. 8, 2004.

Office Action dated May 1, 2007 (6 pages), U.S. Appl. No. 11/010,117, filed Dec. 8, 2004.

Office Action dated Oct. 17, 2007 (6 pages), U.S. Appl. No. 11/010,117, filed Dec. 8, 2004.

Halliburton brochure entitled "AccoladeTM drilling fluid exceeds new GOM environmental standards and boosts performance," 2002, 2 pages, Halliburton.

Baroid product data sheet entitled "BARACARB® bridging agent," 2002, 2 pages, Halliburton.

Halliburton brochure entitled "Bentonite diesel oil slurry (BDO) lost-circulation material," 2000, 2 pages, Halliburton Energy Services, Inc.

Halliburton brochure entitled "CFR-2 cement friction reducer," 1999, 2 pages, Halliburton Energy Services, Inc.

Baroid brochure entitled "Diamond SealTM absorbent polymer for lost circulation," 1999, 2 pages, Baroid, a Halliburton PSL.

Halliburton brochure entitled "Diesel-oil cement water-control system," 1999, 2 pages, Halliburton Energy Services, Inc.

Hallburton brochure entitled "DOC-3 surfactant," 1999, 2 pages, Halliburton Energy Services, Inc.

Baroid product data sheet entitled "DRILTREAT® oil wetting agent," 2002, 1 page, Halliburton.

Halliburton brochure entitled "Econolite additive for cement slurries," 1998, 2 pages, Halliburton Energy Services, Inc.

Baroid product data sheet entitled "EZ MUL® NT emulsifier," 2004, 1 page, Halliburton.

Halliburton brochure entitled "Cementing FlexPlug® OBM lost-circulation material," 2004, 2 pages, Halliburton.

Halliburton brochure entitled "FlexPlugSM service stop lost circulation, hold your bottom line," 1998, 2 pages, Halliburton Energy Services, Inc.

Halliburton brochure entitled "Cementing FlexPlug® W lost-circulation material," 2004, 2 pages, Halliburton.

Halliburton brochure entitled "Flo-Chek® service lost-circulation service," 2000, 2 pages, Halliburton Energy Services, Inc.

Halliburton Services marketing publication entitled "HydroChek service—MOC/one slurry for selective water control," 4 pages, Halliburton.

Baroid product data sheet entitled "HYDRO-PLUGTM lost circulation material," 2002, 1 page, Halliburton.

Baroid brochure entitled "HYDRO-PLUGTM lost circulation plug a single-sack hydrating crystallized polymer blend," 2002, 2 pages, Halliburton.

Baroid product data sheet entitled "STEELSEALTM lost circulation material," 2002, 1 page, Halliburton.

Baroid product data sheet entitled STEELSEAL FINETM lost circulation material, 2002, 1 page, Halliburton.

Halliburton brochure entitled "StrataLockTM wellbore/formation stabilization system," 2003, 4 pages, Halliburton.

Halliburton brochure entitled "Increased integrity with the StrataLock stabilization system," 1998, 2 pages, Halliburton Energy Services, Inc.

Halliburton brochure entitled "VersaSetTM cementing system," 1996, 2 pages, Halliburton Company.

Dalrymple, E. D., et al., "A selective water control process," SPE 24330, 1992, pp. 225-230, Society of Petroleum Engineers, Inc.

Sweatman, Roland, E., et al., "New solutions to remedy lost circulation, crossflows, and underground blowouts," SPE/IADC 37671, 1997, pp. 1-16, SPE/IACD Drilling Conference.

Eoff, Larry, "Water-dispersible resin system for wellbore stabilization," SPE 64980, 2001, pp. 1-10, Society of Petroleum Engineers, Inc.

Encyclopedia of Polymer Science and Engineering, vol. 11, Second Edition, 1988, cover pp. (3) and pp. 45-95, John Wiley & Sons, Inc.

Notice of Allowance dated Nov. 17, 2008 (14 pages), U.S. Appl.No. 11/010,117, filed Dec. 8, 2004.

Office Action dated Sep. 11, 2008 (13 pages), U.S. Appl. No. 11/270,986, filed Nov. 11, 2005.

Office Action (Final) dated Nov. 4, 2008 (22 pages), U.S. Appl. No. 11/271,174, filed Nov. 11, 2005.

Office Action dated Mar. 25, 2009 (36 pages), U.S. Appl. No. 11/744,337, filed May 4, 2007.

Claytone® II —Organophilic Bentonite Product Bulletin, http://www.claytone.net/bulletins/CLAY-II.htm, Apr. 15, 2005, 5 pages.

Halliburton brochure entitled "D-Air 3000 and D-Air 3000L Defoamers," 1999, 2 pages, Halliburton Energy Services, Inc.

Halliburton brochure entitled "FlexPlug® W Lost-Circulation Material," Aug. 2004, 2 pages, Halliburton.

Halliburton brochure entitled "Latex 2000 Cement Additive," 1998, 2 pages, Halliburton Energy Services, Inc.

Halliburton brochure entitled "Stabilizer 434B Latex Stabilizer," 1999, 2 pages, Halliburton Energy Services, Inc.

Halliburton brochure entitled "Stabilizer 434C Surfactant," 1998, 2 pages, Halliburton Energy Services, Inc.

Halliburton brochure entitled "The PermSeal(TM) System," Mar. 2002, 2 pages, Halliburton.

Halliburton brochure entitled "DrillAhead® Services," 2004, 1 page, Halliburton.

Halliburton Material Safety Data Sheet entitled "INVERMUL® RF system with BARACARB®," Aug. 22, 2002, pp. 1-7, Halliburton.

Halliburton Material Safety Data Sheet entitled "INVERMUL® RF system with BARODENSE®," Aug. 22, 2002, pp. 1-7, Halliburton.

Halliburton Material Safety Data Sheet entitled "INVERMUL® RF system with BAROID®," Aug. 22, 2002, pp. 1-7, Halliburton.

Office Action dated Aug. 20, 2007 (21 pages), U.S. Appl. No. 11/270,986, filed Nov. 11, 2005.

Office Action dated Dec. 26, 2007 (14 pages). U.S. Appl. No. 11/270,986, filed Nov. 11, 2005.

Office Action dated May 2, 2008 (10 pages). U.S. Appl. No. 11/010,117, filed Dec. 8, 2004.

Office Action dated May 16, 2008 (8 pages), U.S. Appl. No. 11/270,986, filed Nov. 11, 2005.

Office Action dated May 28, 2008 (29 pages), U.S. Appl. No. 11/271,174, filed Nov. 11, 2005.

Schlumberger Oilfield Glossary, "gyp mud" definition, http://www.glossary.oilfield.slb.com/Display.cfm?Term=gyp%20mud, May 23, 2008, 1 page, Schlumberger Limited.

* cited by examiner

SEALANT COMPOSITIONS COMPRISING COLLOIDALLY STABILIZED LATEX AND METHODS OF USING THE SAME

FIELD OF THE INVENTION

This invention generally relates to sealant compositions for use in a wellbore. More specifically, the invention relates to sealant compositions comprising colloidally stabilized latex and methods of using such compositions to service a wellbore.

BACKGROUND OF THE INVENTION

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downwardly through the interior of the pipe and upwardly through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing. While a cement slurry is one type of sealant composition used in primary and secondary cementing operations, other non-cement containing sealant compositions may also be employed.

Latex emulsions, which contain a stable water-insoluble, polymeric colloidal suspension in an aqueous solution, are commonly used in sealant compositions to improve the properties of those compositions. For example, latex emulsions are used in cement compositions to reduce the loss of fluid therefrom as the compositions are being pumped to the annulus. Latex emulsions are also employed to reduce the brittleness of the sealant compositions; otherwise the compositions may shatter under the impacts and shocks generated by drilling and other well operations. Such sealant compositions may be used for sealing the junction of multilateral wells. In addition, latex emulsions are used to improve the flexibility of sealant compositions.

Additionally, latex emulsions are utilized to prevent gas migration during a transition phase in which the sealant composition changes from a true hydraulic fluid to a highly viscous mass showing some solid characteristics. When first placed in the annulus, the sealant composition acts as a true liquid and thus transmits hydrostatic pressure. During the transition phase, certain events occur that cause the sealant composition to lose its ability to transmit hydrostatic pressure such as the development of a solid (i.e., stiff) structure in the composition. When the pressure exerted on the formation by the sealant composition falls below the pressure of the gas in the formation, the gas initially migrates into and through the composition. The gas migration causes flow channels to form in the sealant composition, and those flow channels permit further migration of the gas after the sealant composition sets.

Moreover, latex emulsions are also mixed with drilling fluids, particularly the non-aqueous type, near loss-circulation zones such as natural or induced fractures, thereby forming solid masses for sealing those zones to prevent the drilling fluids from being lost during drilling.

Traditional latex emulsions prepared by emulsion polymerization usually become unstable in the presence of salt. That is, the polymer particles contained in the latex typically fall out of the aqueous solution and form a separate rubbery phase when exposed to salt. Unfortunately, sealant compositions often come into contact with salts that are naturally present in the wellbore. Further, the sealant compositions themselves often contain salts of monovalent, divalent, and occasionally trivalent cations. They may even be saturated with such salts to ensure that they do not wash out or dissolve salt zones located in the subterranean formation. To improve the tolerance of latex emulsions in sealant compositions to salts, especially those containing monovalent and divalent cations, surfactants such as ethoxylated nonylphenol sulfates are included in the compositions. The use of such surfactants in the sealant compositions undesirably increases the overall cost of constructing and maintaining the wellbore. A need therefore exists to use latexes in sealant compositions, such as cement slurries, that are stable in the presence of salts.

SUMMARY OF THE INVENTION

Sealant compositions for use in a wellbore comprise a colloidally stabilized latex. The colloidally stabilized latex may include: an aliphatic conjugated diene monomer; an additional monomer comprising a non-aromatic unsaturated mono- or di-carboxylic ester monomer, an aromatic unsaturated monomer, a nitrogen-containing monomer, or combinations thereof; and a protective colloid. In an embodiment, the sealant compositions may include a cement slurry.

Methods of servicing a wellbore comprise displacing the foregoing sealant composition into the wellbore. The sealant composition may be positioned in the wellbore to isolate the subterranean formation from a portion of the wellbore, to support a conduit in the wellbore, to plug a void or crack in the conduit, to plug a void or crack in a cement sheath disposed in an annulus of the wellbore, to plug an opening between the cement sheath and the conduit, to prevent the loss of drilling fluid into a void or crack in the formation, or combinations thereof. The colloidally stabilized latex remains substantially stable when exposed to salt, which may be present in the wellbore and/or in the sealant composition itself.

DETAILED DESCRIPTION OF THE PREFERRED EMBODIMENTS

In accordance with an embodiment, sealant compositions for use in a wellbore that penetrates a subterranean formation comprise a colloidally stabilized latex. It is understood that "subterranean formation" encompasses both areas below exposed earth or areas below earth covered by water such as sea or ocean water. As used herein, "colloidally stabilized latex" refers to a latex comprising polymer particles suspended in an aqueous solution and at least one protective colloid for providing stabilization to the colloidal polymer emulsion. The colloidally stabilized latex may be employed in a sealant composition to control fluid loss from the composition, to improve gas migration potential, to improve the flexibility or elasticity of the set composition, to improve the properties of the composition such as compressive strength, tensile strength, and rheology, to prevent drilling fluid losses, to seal junctions in multi-lateral wells, to temporarily plug loss-circulation zones in remedial operations, and so forth.

Protective colloids known in the art may be employed in the colloidally stabilized latex. Examples of suitable protective colloids include, but are not limited to, partially and fully hydrolyzed polyvinyl alcohols, cellulose ethers such as hydroxymethyl cellulose, hydroxyethyl cellulose, hydroxypropyl cellulose, starch and starch derivatives, and carboxymethyl cellulose, natural and synthetic gums such as gum tragacanth and gum arabic, polyacrylic acid, acrylates, poly(vinyl alcohol)co(vinyl amine) copolymers, and combinations thereof.

Examples of suitable colloidally stabilized latexes for use in the sealant compositions and methods of making such latexes are described in U.S. Pat. Nos. 5,900,451 and 6,130,287, both of which are incorporated by reference herein in their entirety. In those patents, the colloidally stabilized latexes are referred to as "stabilized emulsion polymers." In addition, examples of suitable commercially sold colloidally stabilized latexes include BS 2100 latex (i.e., carboxylated butadiene acrylonitrile latex) available from Dow Reichhold Inc. As would be recognized by one skilled in the art, the dry form of such colloidally stabilized latexes may also be employed.

In an embodiment, the polymer contained in the colloidally stabilized latex may include an aliphatic conjugated diene monomer and a at least one additional monomer comprising a non-aromatic unsaturated mono- or di-carboxylic ester monomer, an aromatic unsaturated monomer, at least one nitrogen-containing monomer, or combinations thereof. Examples of suitable aliphatic conjugated diene monomers include $C_4$ to $C_9$ dienes such as butadiene monomers, e.g., 1,3-butadiene, 2-methyl-1,3-butadiene, 2 chloro-1,3 butadiene, 2-methyl-1,3-butadiene, and 2 chloro-1,3-butadiene. Blends or copolymers of the diene monomers may also be used. Examples of suitable non-aromatic unsaturated monocarboxylic ester monomers include acrylates, methacrylates, and combinations thereof. The acrylates and methacrylates may include functional groups such as amino groups, hydroxy groups, and epoxy groups. Examples of suitable non-aromatic unsaturated dicarboxylic ester monomers include alkyl and dialkyl fumarates, itaconates, maleates, and combinations thereof, with the alkyl group having from one to eight carbons. In a preferred embodiment, a non-aromatic unsaturated monocarboxylic ester monomer employed in the colloidally stabilized latex is methyl methacrylate. Examples of suitable aromatic unsaturated monomers include styrene and styrene derivatives such as alphamethylstyrene, p-methyl styrene, divinyl benzene, vinyltoluene, divinyl toluene, ethylstyrene, tert-butyl styrene, monochlorostyrene, dichlorostyrene, vinyl benzyl chloride, fluorostyrene, alkoxystyrenes (e.g., paramethoxystyrene), and combinations thereof. In a preferred embodiment, an aromatic unsaturated monomer included in the colloidally stabilized latex is styrene. Examples of suitable nitrogen-containing monomers include acrylonitrile, methacrylonitrile, acrylamide, methacrylamide, N-methylolacrylamide, alkylated N-methylolacrylamides such as N-methoxymethylacrylamide and N-butoxymethylacrylamide, acrolein, and combinations thereof. In a preferred embodiment, a nitrogen-containing monomer included in the colloidally stabilized latex is acrylonitrile.

In one embodiment, the colloidally stabilized latex also includes a surfactant having ethylenic unsaturation, an oxyalkylene functional monomer, or combinations thereof incorporated in the backbone of the polymer. The surfactant is copolymerized with the aliphatic conjugated diene monomer and the additional monomer and is preferably located at the surface of the polymer particles. Since the surfactant is an integral part of the polymer, it most likely cannot desorb from the polymer. Examples of suitable surfactants are disclosed in U.S. Pat. No. 5,296,627, which is incorporated by reference herein in its entirety. The surfactant preferably has a hydrophobic portion that possesses terminal ethylenic unsaturation and a hydrophilic portion that contains a poly(alkyleneoxy) segment. Examples of suitable oxyalkylene functional monomers include monoesters of carboxylic acid or dicarboxylic acid, diesters of dicarboxylic acid, compounds generally represented by the following formulas, and combinations thereof:

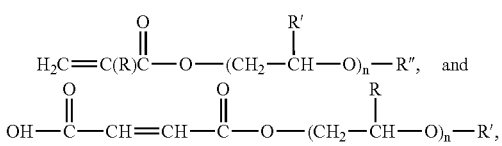

where R is hydrogen or a $C_1$-$C_4$ alkyl, R' is hydrogen or a $C_1$-$C_4$ alkyl, R" is hydrogen or a $C_1$-$C_4$ alkyl, and n is in a range of from 1 to 30. The oxyalkylene functional monomer is copolymerized with the aliphatic conjugated diene monomer and the additional monomer. Additional examples of surfactants and oxyalkylene functional monomers that may be employed in the colloidally stabilized latex are provided in aforementioned U.S. Pat. No. 5,900,451.

In the foregoing embodiment in which the colloidally stabilized latex includes a surfactant having ethylenic unsaturation and/or an oxyalkylene functional monomer, the amount of protective colloid present in the colloidally stabilized latex is preferably in the range of from about 0.1 percent (hereinafter "%") to about 10% by total weight of the starting monomers, more preferably from about 1% to about 8%, and most preferably from about 2% to about 6%. The amount of aliphatic conjugated diene monomer present in the colloidally stabilized latex is preferably in the range of from about 5% to about 95% by total weight of the starting monomers, more preferably from about 20% to about 80%. The amount of non-aromatic unsaturated mono- or di-carboxylic ester monomer present in the colloidally stabilized latex is preferably in the range of from about 5% to about 95% by total weight of the starting monomers, more preferably from about 20% to about 80%. The amount of aromatic unsaturated monomer present in the colloidally stabilized latex is preferably in the range of from about 5% to about 95% by total weight of the starting monomers, more preferably from about 20% to about 80%. The amount of nitrogen-containing monomer present in the colloidally stabilized latex is preferably in the range of from about 5% to about 95% by total weight of the starting monomers, more preferably from about 20% to about 80%. The amount of surfactant present in the colloidally stabilized latex is preferably in the range of from about 0.1% to about 5% by total weight of the starting monomers, more preferably from about 1% to about 4%, and most preferably from about 2% to about 3%. The amount of oxyalkylene functional monomer present in the colloidally stabilized latex is preferably in the range of from about 0.1% to about 7% by total weight of the starting monomers, more preferably from about 1% to about 3%. When the surfactant and the oxyalkylene functional monomer are both used, the colloidally stabilized latex preferably contains from about 0.5% to about 2% of the surfactant and from about 1% to about 3% of the oxyalkylene functional monomer by total weight of the starting monomers.

In another embodiment, the colloidally stabilized latex includes a functionalized silane incorporated in the polymer that is capable of adsorbing the protective colloid. Examples of suitable functionalized silanes are generally represented by the following formula:

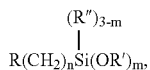

where R″ is a $C_1$ to $C_5$ alkyl, R' is a $C_1$ to $C_5$ alkyl, R is SH, $CH_2=CH-$, $CH_2=C(CH_3)-C(O)O-$, $CH_2=CH-C(O)O-$, and

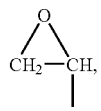

n is in a range of from 1 to 10, and m is 2 or 3. A preferred functionalized silane is gamma mercaptopropyl trimethoxy silane in which R is SH, R' is $C_1$ alkyl, n is 3, and m is 3. Unsaturated mono- or di-carboxylic acid monomers and derivatives thereof, such as acrylic acid, methacrylic acid, itaconic acid, fumaric acid, and malieic acid, may also be employed in the colloidally stabilized latex. Additional examples of surfactants and oxyalkylnlene functional monomers that may be employed in the colloidally stabilized latex are provided in aforementioned U.S. Pat. No. 6,130,287.

In the foregoing embodiment in which the colloidally stabilized latex includes a functionalized silane, the amount of protective colloid present in the latex is preferably in the range of from about 1 percent (hereinafter "%") to about 10% by total weight of the starting monomers. The amount of aliphatic conjugated diene monomer present in the colloidally stabilized latex is preferably in the range of from about 1% to about 99% by total weight of the starting monomers, more preferably from about 10% to about 70%, and most preferably from about 20% to about 50%. The amount of non-aromatic unsaturated mono- or di-carboxylic ester monomer present in the colloidally stabilized latex is preferably in the range of from about 1% to about 99% by total weight of the starting monomers, more preferably from about 50% to about 80%. The functionalized silane may be present in the colloidally stabilized latex in various amounts. For example, the amount of silane present in the polymer may range from about 0.01% to about 2% by total weight of the starting monomers, preferably about 0.5%.

In yet another embodiment, when the colloidally stabilized latex composition contains cross-linkable monomers such as N-methylolacrylamide and alkylated N-methylolacrylamides such as N-methoxymethylacrylamide and N-butoxymethylacrylamide, appropriate acidic catalysts may be included in the latex to serve as crosslinking agents. Such acidic catalysts provide for the formation of a resilient rubbery mass. Examples of suitable acidic catalysts include para-toluene sulfonic acid, an ammonium salt such as ammonium sulfate, ammonium chloride, ammonium acetate, and combinations thereof. In an embodiment in which the colloidally stabilized latex contains both a vulcanizable monomer and a crosslinkable monomer, it may further include a vulcanizing agent in addition to the acidic catalyst. In another embodiment, the colloidally stabilized latex may include thermosetting resins such as melamine-formaldehyde derived resins and urea-formaldehyde resins that are capable of participating in the crosslinking reactions in the presence of the acidic catalysts.

The colloidally stabilized latex may further include additional additives as deemed appropriate by one skilled in the art. For example, crosslinking agents, additional monomers, initiators, reducing agents, and so forth may be employed to improve the properties of the latex and/or to facilitate the polymerization of the monomers employed in the latex.

In addition to the colloidally stabilized latex, the sealant compositions may optionally comprise a cement slurry. A known cement may be used in the cement slurry, including hydraulic cement containing calcium, aluminum, silicon, oxygen, and/or sulfur, which sets and hardens by reaction with water. Examples of suitable hydraulic cements include Portland cements, pozzolana cements, gypsum cements, phosphate cements, high alumina content cements, silica cements, and high alkalinity cements. The cement slurry also contains a sufficient amount of fluid to form a pumpable slurry. The fluid may be, for example, fresh water or salt water such as an unsaturated aqueous salt solution or a saturated aqueous salt solution, e.g., brine or seawater. The amount of water utilized in the cement slurry may range, for example, from about 30% to about 150% by weight of the cement, more preferably from about 35% to about 60% by weight of the cement. The relative amounts of the colloidally stabilized latex and the cement in a particular sealant composition depend upon the intended use of the resulting composition. For example, the sealant compositions may contain from about 0.01 gallon to about 3.0 gallons of colloidally stabilized latex per 100 pounds of cement, more preferably from about 0.5 gallons to about 2 gallons per 100 pounds of cement. The cement, fluid, and the sealant composition may be combined in any suitable order. For example, the sealant composition may be combined with the fluid before adding cement to the resulting mixture. Alternatively, the cement and the fluid may be combined to form a cement slurry before adding the sealant composition to the cement slurry. Examples of suitable sealant compositions comprising hydraulic cement are disclosed in U.S. Pat. No. 5,588,488, which is incorporated by reference herein in its entirety.

The sealant compositions may also include salts of monovalent (e.g., $Na^+$), divalent (e.g., $Ca^{2+}$), and trivalent cations. In an embodiment, the sealant compositions are saturated with such salts to ensure that they do not wash out or dissolve salt zones located in the subterranean formation. The colloidally stabilized latex has a relatively high tolerance to salts. Thus, it desirably remains stable in the presence of the salts contained in the sealant compositions and in the presence of salts that it may encounter in the wellbore without the need to introduce additional stabilizing surfactants, e.g., ethyoxylated nonylphenol surfactant, to the sealant compositions. It is understood that, if desired, such stabilizing surfactants still may be employed in the sealant compositions and may be distinguished from ethylenically unsaturated surfactants incorporated in the backbone of the latex polymer.

In an embodiment, the sealant composition may include the following components: vulcanizable groups such as the diene type of monomers discussed above, e.g., butadiene; vulcanizing agents such as sulfur, 2,2'-dithiobisbenzothiazole, organic peroxides, azo compounds, alkylthiuram disulfides, and selenium phenolic derivatives; vulcanization accelerators such as fatty acids such as stearic acid, metallic oxides such as zinc oxide, aldehyhyde amine compounds, guanidine compound, and disulfide thiuram compounds; vulcanization retarders such as salicylic acid, sodium acetate, phthalic anhydride, and N-cyclohexyl thiophthalimide; defoamers; fillers to increase or decrease the treatment density as required; co combinations thereof. Additional disclosure regarding suitable latexes containing such materials can be found in U.S. Pat. Nos. 5,293,938 and 5,159,980, each of which is incorporated by reference herein in its entirety.

As deemed appropriate by one skilled in the art, the sealant compositions may further include additional additives for improving or changing the properties of the compositions. For example, beads and fibers, such as carbon fibers or WOLLASTOCOAT fibers commercially available from NYCO Minerals, Inc. of Willsboro, N.Y., may be included in the sealant compositions to improve their mechanical properties such as tensile strength, compressive strength, and so forth. Examples of other additives include, but are not limited to, set retarders, dispersing agents, set accelerators, and defoamers.

According to an embodiment, methods of using a previously described sealant composition to service a wellbore that penetrates a subterranean formation include displacing the composition into the wellbore to allow it to be used for its intended purpose. As described previously, the colloidally stabilized latex contained in the sealant composition preferably remains stable in the presence of salts that it contacts as it passes through the wellbore. That is, the colloidally stabilized latex remains dispersed in its aqueous solution and thus does not separate out into a rubbery mass or layer.

In an embodiment, the foregoing sealant compositions that include the colloidally stabilized latex and the cementitious material may be employed in well completion operations such as primary and secondary cementing operations. In primary cementing, such a sealant composition may be displaced into an annulus of the wellbore and allowed to set such that it isolates the subterranean formation from a portion of the wellbore. The sealant composition thus forms a barrier that prevents fluids in that subterranean formation from migrating into other subterranean formations. Within the annulus, the sealant composition also serves to support a conduit, e.g., casing, in the wellbore. In one embodiment, the wellbore in which the sealant composition is positioned belongs to a multilateral wellbore configuration. A multilateral wellbore configuration includes at least two principal wellbores connected by one or more ancillary wellbores. In secondary cementing, the sealant composition may be strategically positioned in the wellbore to plug a void or crack in the conduit, to plug a void or crack in the hardened sealant, e.g., cement sheath, residing in the annulus, to plug a relatively small opening known as a microannulus between the hardened sealant and the conduit, and so forth. Various procedures that may be followed to use the sealant composition in a wellbore are described in U.S. Pat. No. 5,346,012, which is incorporated by reference herein in its entirety, and previously incorporated U.S. Pat. No. 5,588,488.

In another embodiment, the foregoing sealant compositions that contain the colloidally stabilized latex but no cementitious material may be utilized in well completion operations such as primary operations. For example, they may be placed behind expandable casings or used for consolidating gravel packs or incompetent formations. Further, such sealant compositions may be utilized in remedial operations such as sealing leaks, cracks, or voids and forming temporary plugs for the purpose of isolating zones to divert subsequent fluids and the like. Additional disclosure regarding the use of cementless sealant compositions for such applications can be found in previously incorporated U.S. Pat. No. 5,159,980 and U.S. Pat. No. 6,668,928, which is incorporated by reference herein in its entirety.

In yet another embodiment, a previously described sealant composition containing a colloidally stabilized latex may be used to prevent the loss of non-aqueous drilling fluids into loss-circulation zones such as voids, vugular zones, and natural or induced fractures while drilling. The sealant composition and the drilling fluid may be pumped as two separate, parallel streams and allowed to mix downhole near the loss-circulation zone. When the two fluids contact each under at downhole conditions, they form a relatively viscous mass inside the loss-circulation zone. This mass plugs the zone and thus inhibits loss of subsequently pumped drilling fluid, thereby allowing for further drilling. Additional disclosure regarding this application of sealant compositions can be found in U.S. Pat. No. 5,913,364, which is incorporated by reference herein in its entirety. The drilling fluid may include a non-aqueous fluid such as a diesel, a mineral oil, an internal olefin, a linear alpha-olefin, an ester, or combinations thereof. It may also contain organophilic clay, an emulsified brine phase, an emulsifier, a viscosifier, a weighting agent such as barium sulfate, or combinations thereof. Suitable sealant compositions for this application may include an organophilic clay, a basic salt, surfactants, and additional water as additives. Such compositions are described in previously incorporated U.S. Pat. No. 5,588,488. The sealant compositions may also contain thermosetting resins such as melamine-formaldehyde derived resins, phenol-formaldehyde derived resins, and urea-formaldehyde derived resins for improving the mechanical properties of the solid mass such as compressive and tensile strengths. The sealant compositions may further contain curing catalysts such as para-toluenesulfonic acid, ammonium salts, magnesium salts, and basic salts. Such compositions are discussed in U.S. Pat. No. 6,508,306, which is incorporated by reference herein in its entirety.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

First, LATEX 2000 latex sold by Halliburton Energy Services, Inc. (i.e., a styrene butadiene latex prepared by conventional methods) was added dropwise to an aqueous solution containing 25 weight (wt.) % sodium chloride (NaCl) salt. Instantaneous precipitation was observed upon contact of the latex with the salt solution. The same procedure was then performed using 10 mL of BS 2100 latex, i.e., a colloidally stabilized latex. No precipitation was observed in the solution containing the BS 2100 latex even after several days.

Example 2

A 40 gram mixture containing a 1:1 weight ratio of LATEX 2000 latex and water was prepared. Then 33 wt.% calcium chloride ($CaCl_2$) solution in water was added dropwise to the latex-containing solution. Most of the LATEX 2000 latex had precipitated out of the solution after 0.7 gram of the $CaCl_2$ salt had been added to the solution. The same procedure was then performed using BS 2100 latex. No sign of precipitation was observed even after 10 grams of $CaCl_2$ salt had been added to the solution containing BS 2100 latex, and the mixture was stable for several days.

Example 3

A control sample of a cement slurry having a density of 16.4 pounds per gallon (ppg) and comprising LATEX 2000 latex, water, class H Portland cement, and a small amount of a STABILIZER 434B surfactant stabilizer available from Halliburton Energy Services, Inc. was prepared. The control sample was cured for 72 hours at a temperature of 190° F. and a pressure of 3,000 psi, followed by measuring, compressive strength and tensile strength. The same properties were measured for a control sample of the same density made from cement and water. In addition, two cement slurry samples containing BS 2100 latex, water, and class H Portland cement were prepared. One sample also contained a small amount of STABILIZER 434C surfactant stabilizer and the other sample contained WOLLASTOCOAT M16 fibers (i.e., a wollastonite mineral coated with an organic hydrophobic material). After curing those samples in the same manner as the control sample was cured the compressive strength and the tensile strength of those samples were also measured. All the slurries were prepared and the compressive strengths were measured according to API Recommended Practice 10B, Twenty-Second Edition, December 1997. The tensile strengths were measured using a briquette mold procedure according to ASTM C 190-85 (outdated). The relative amounts of the samples used in this example and the values of the mechanical properties taken for the samples are shown in Table 1 below.

contained 0.05 gallon/sack D-AIR 3000L defoamer and HR-6L retarder, both of which are available from Halliburton Energy Services, Inc. All of the ingredients except cement were added to mix water, followed by the addition of cement according to the previously mentioned API procedure. Not listed in Table 2 are slurries the preparation of which was attempted using LATEX 2000 latex. Those non-listed slurries were identical to control slurries #1 and #2 except that the STABILIZER 434B surfactant was left out. Upon stirring, the non-listed slurries became too viscous, gelled quickly, and thus could not be used.

TABLE 1

| Sample | Water, % bwoc[2] | Stabilizer Surfactant, gallon/sack of cement (gal/sk) | BS 2100 latex, gal/sk | Other Additives | Density, ppg | Compressive Strength, psi | Tensile Strength, psi |
|---|---|---|---|---|---|---|---|
| 1[1] (control) | 33.20 | 0.07 | — | LATEX 2000 latex, 0.7 gal/sk | 16.31 | 3,880 | 470 |
| 2 (control) | 39.42 | — | — | — | 16.4 | 4,340 | 430 |
| 3[1] | 33.20 | 0.07 | 0.74 | | 16.32 | 5,490 | 600 |
| 4[1] | 33.20 | — | 0.74 | WOLLASTOCOAT M15[3], 0.75% bwoc | 16.4 | 4,390 | 570 |

[1]Contained 0.02 gal/sk of D-AIR 3000 defoamer available from Halliburton Energy Services, Inc.

[2]Does not include the water present in the latex and surfactant solutions;

bwoc = by weight of the cement

As shown in Table 1, the compressive strength and the tensile strength of the cement slurry samples containing the BS 2100 latex were higher than those of the control samples. The results in Table 1 thus show that the mechanical properties of set cement samples can be improved relative to control samples with or without traditional latex.

Example 4

Cement slurries of 16.4 ppg density were prepared according to the formulations listed in Table 2, and each additionally The slurries were placed in an atmospheric consistometer preheated to 190° F. and stirred at 100 rpm for 20 minutes. The initial and final viscosity after 20 minutes were measured in Bearden units (Bc). These measured values indicated the pumpability and response of the slurry viscosity to heating. The heated slurry was then subjected to fluid measurement according to the previously mentioned API procedure. Also, using another sample that had been preheated to 190° F., the rheology at different shear rates was measured using a Fann 35 viscometer at 190° F. The results are provided in Table 3.

TABLE 2

| Sample No. | Water, % bwoc | Latex Type | Latex Amount, gal/sk | Surfactant, gal/sk | Dispersant Type | Dispersant Amount, gal/sk | Salt, % bwow |
|---|---|---|---|---|---|---|---|
| 1 (Control) | 26.7 | LATEX 2000 | 1 | 0.2 | CFR-3L[1] | 0.143 | None |
| 2 (Control) | 30.7 | LATEX 2000 | 1 | 0.2 | CFR-3L | 0.143 | 18 |
| 3 (Control) | 29.9 | LATEX 2000 | 1 | 0.2 | None | — | 18 |
| 4 | 29.03 | BS 2100 | 1 | None | MEGAPOL MP[2] | 0.06 | None |
| 5 | 31.3 | BS 2100 | 1 | None | MEGAPOL MP | 0.06 | 18 |

[1]Available from Halliburton Energy Services, Inc.

[2]Available from Handi Chemicals Limited, Candiac, Canada

TABLE 3

| Sample | Viscosity, Bc | Fann Rheology @ 600-300-200-100-60-30-20-10-6-3 rpm | Fluid Loss, cc/30 min. |
|---|---|---|---|
| Sample 1 (Control) | Initial - 3; Final - 4 | 23-15-8-5-4-2-2-1.5-1 | 72 |
| Sample 2 (Control) | Initial - 3; Final - 4 | 19-12-7-5-4-3-2-1-1 | 88 |
| Sample 3 (Control) | Initial - 4; Final - 4 | 20-14-8-5-4-3-2-1-1 | 139[1] |
| Sample 4 | Initial - 4; Final - 5 | 23-14-7-4-3-2-1.5-1-1 | 217[1] |
| Sample 5 | Initial - 8; Final - 10 | 78-58-39-31-24-22-16-14-12 | 584[1] |

[1] The fluid loss value was calculated according to the previously mentioned API procedure after collecting the filtrate for a period As shown in Table 3, the colloidally stabilized latex containing slurries exhibited satisfactory fluid loss values. The results in Table 3 show that useable slurries can be made with colloidally stabilized latex without needing latex stabilizing surfactants.

Example 5

Slurries of 12.0 ppg were prepared according to the formulations shown in Table 4. They were cured and analyzed for compressive and tensile strengths as described in Example 3.

TABLE 4

| Class H cement, % bwoc | Flyash[1], % bwoc | Fumed silica[2], % bwoc | Bentonite, % bwoc | Latex 2000, gal/sk | BS 2100 gal/sk | Surfacant[3] gal/sk | Compr. Strength, Psi | Tens. Strength, psi |
|---|---|---|---|---|---|---|---|---|
| 56 | 22 | 22 | 2 | 0.75 |  | 0.15 | 1020 | 100 |
| 56 | 22 | 22 | 2 |  | 0.75 | 0.15 | 1780 | 95 |

[1] Class F microflyash available from Halliburton Energy Services, Inc.
[2] Available from Halliburton Energy Services, Inc. under the tradename SILICALITE fumed silica
[3] Available from Halliburton Energy Services, Inc. under the tradename STABILIZER 434C surfactant The results in Table 4 show that the mechanical properties of cement slurries containing pozzalonic materials can also be improved with colloidally stabilized latexes.

Example 6

An equal volume of oil-based mud available from Baroid Drilling Company was added to a mixture of LATEX 2000 latex diluted with an equal volume of water, organophilic clay (28% by weight of the latex mixture), and a STABILIZER 434C surfactant (6% by weight of the latex mixture). The mixture underwent viscosification, and a solid with moldable consistency was formed within 2 minutes. The composition was cured at 180° F. for 18 hours. A second composition with an identical mixture was made by replacing LATEX 2000 latex with a JG 6092-99-00 colloidally stabilized styrene-butadiene based latex obtained from Dow Reichhold Corp., except that the stabilizing surfactant was left out. The composition viscosified in about 3 minutes and formed a moldable mass. The material was cured at 180° F. for 18 hours. The results indicated that mixing oil-based muds with the compositions containing colloidally stabilized latex quickly forms competent viscous masses without the need for a latex stabilizing surfactant, thus preventing drilling fluid circulation losses.

Example 7

A mixture containing BS 2100 colloidally stabilized latex and water at a weight ratio of 1:1 was mixed with para-toluenesulfonic acid (10% by weight of the active polymer content of the latex) and heated at 195° F. for 48 hrs. The latex cross-linked, and a homogeneous rubbery mass of cured solid with a trace of free water formed. This result indicates the ability of colloidally stabilized latexes provided with cross-linkable functional groups to form resilient compositions that are useful in applications such as sealant systems for multilateral wells, expandable tubulars, and the like.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in contact with a subterranean formation, comprising: placing a sealant composition comprising a colloidally stabilized latex into the wellbore and contacting the sealant composition with salt as it passes through the wellbore, wherein the colloidially stabilized latex comprises a protective colloid comprising polyvinylalcohol, a cellulose ether, a natural gum, a synthetic gum, polyacrylic acid, an acrylate, a poly(vinyl alcohol)co(vinyl amine) copolymer, or combinations thereof and does not precipitate in a solution of at least 25 weight percent salt.

2. The method of claim 1, wherein the colloidally stabilized latex comprises:

(a) an aliphatic conjugated diene monomer; and
(b) an additional monomer comprising a non-aromatic unsaturated mono- or di-carboxylic ester monomer, an aromatic unsaturated monomer, a nitrogen-containing monomer, or combinations thereof.

3. The method of claim 2, wherein the colloidally stabilized latex comprises a functionalized silane generally represented by:

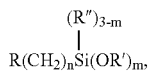

wherein R" is a $C_1$ to $C_5$ alkyl, R' is a $C_1$ to $C_5$ alkyl, R is SH, $CH_2=CH-$, $CH_2=C(CH_3)-C(O)O-$, $CH_2=CH-C(O)O-$, or

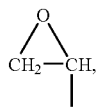

n is in a range of from 1 to 10, and m is 2 or 3.

4. The method of claim 3, wherein the sealant composition comprises cement.

5. The method of claim 3, wherein the sealant composition comprises fibers, beads, or combinations.

6. The method of claim 2, wherein the colloidally stabilized latex comprises a surfactant having ethylenic unsaturation that copolymerizes with the aliphatic conjugated diene monomer and the additional monomer, thereby forming a polymer having the surfactant in its backbone.

7. The method of claim 2, wherein the sealant composition comprises cement.

8. The method of claim 2, wherein the sealant composition comprises fibers, beads, or combinations.

9. The method of claim 1, wherein the colloidally stabilized latex comprises an oxyalkylene functional monomer comprising

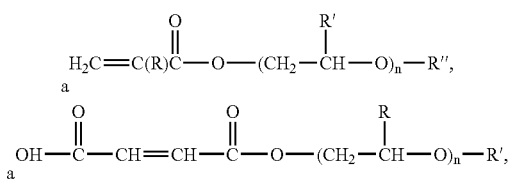

a monoester of mono- or di-carboxylic acid, a diester of dicarboxylic acid, or combinations thereof, wherein R is hydrogen or a $C_1$-$C_4$ alkyl, R' is hydrogen or a $C_1$-$C_4$ alkyl, R" is hydrogen or a $C_1$-$C_4$ alkyl, and n is in a range of from 1 to 30, and wherein the oxyalkylene functional monomer copolymerizes with the aliphatic conjugated diene monomer and the additional monomer.

10. The method of claim 9, wherein the sealant composition comprises cement.

11. The method of claim 9, wherein the sealant composition comprises fibers, beads, or combinations.

12. The method of claim 1, wherein the salt comprises a monovalent ion, a divalent ion, or combinations thereof.

13. The method of claim 12, wherein the sealant composition is displaced into an annulus of the wellbore and allowed to set.

14. The method of claim 12, wherein the sealant composition comprises cement.

15. The method of claim 12, wherein the sealant composition comprises fibers, beads, or combinations.

16. The method of claim 1, wherein the sealant composition comprises fibers, beads, or combinations thereof.

17. The method of claim 16, wherein the sealant composition comprises fibers, beads, or combinations.

18. The method of claim 1, wherein the sealant composition comprises a cement slurry.

19. The method of claim 1, wherein the sealant composition is positioned in the wellbore to isolate the subterranean formation from a portion of the wellbore, to support a conduit in the wellbore, to plug a void or crack in the conduit, to plug a void or crack in a cement sheath disposed in an annulus of the wellbore, to plug an opening between the cement sheath and the conduit, or combinations thereof.

20. The method of claim 1, wherein the colloidally stabilized latex comprises a vulcanizable group, a vulcanizing agent, a vulcanization accelerator, a vulcanization retarder, or combinations thereof.

21. The method of claim 20, wherein the sealant composition comprises cement.

22. The method of claim 20, wherein the sealant composition comprises fibers, beads or combinations.

23. The method of claim 1, wherein the colloidally stabilized latex comprises a crosslinkable monomer, an acidic catalyst, a thermosetting resin, or combinations thereof.

24. The method of claim 23, wherein the sealant composition comprises cement.

25. The method of claim 23, wherein the sealant composition comprises fibers, beads, or combinations.

26. The method of claim 1, further comprising combining a drilling fluid with the sealant composition near a loss-circulation zone, thereby forming a solid mass in the loss-circulation zone.

27. The method of claim 26, wherein the sealant composition comprises cement.

28. The method of claim 26, wherein the sealant composition comprises fibers, beads, or combinations.

29. The method of claim 1, wherein the sealant composition comprises cement.

30. The method of claim 1, wherein the sealant composition comprises fibers, beads, or combinations.

31. The method of claim 1, wherein the wellbore service comprises primary cementing in the wellbore.

32. The method of claim 1, wherein the wellbore service comprises secondary cementing in the wellbore.

33. The method of claim 1, wherein the wellbore service comprises remediating lost circulation while drilling.

* * * * *